United States Patent [19]

Simpkins et al.

[11] Patent Number: 5,123,017
[45] Date of Patent: Jun. 16, 1992

[54] REMOTE MAINTENANCE MONITORING SYSTEM

[75] Inventors: Lorenz G. Simpkins, Merritt Island, Fla.; Richard C. Owens, Kawaski, Japan; Donn A. Rochette, Cocoa, Fla.

[73] Assignee: The United States of America as represented by the Administrator of the National Aeronautics and Space Administration, Washington, D.C.

[21] Appl. No.: 414,817

[22] Filed: Sep. 29, 1989

[51] Int. Cl.⁵ .............................. G06F 15/20
[52] U.S. Cl. ................................... 371/15.1
[58] Field of Search ........... 371/15.1, 29.1, 11, 371/20.1; 364/513

[56] References Cited

U.S. PATENT DOCUMENTS

| | | | |
|---|---|---|---|
| 4,456,994 | 6/1984 | Segarra | 371/16 |
| 4,881,230 | 11/1989 | Clark et al. | 371/20.1 |
| 4,943,919 | 7/1990 | Aslin et al. | 364/424.03 |
| 4,964,125 | 10/1990 | Kim | 371/15.1 |
| 4,967,337 | 10/1990 | English et al. | 364/187 |
| 4,972,453 | 11/1990 | Daniel et al. | 379/10 |

OTHER PUBLICATIONS

Miller et al., Artificial Intelligence Applications in the Computer Electronics Industry, pp. 33-44, 70-85, Seai Technical Publications P. O. Box 590 Madison Georgia 30650 1988.
The Fairmont Press, Inc., 700 Indian Trail, Lilburg Georgia 30247.
Waterman, A Guide to Expert Systems, pp. 249-259 Addison-Wesley Publishing Co., Reading, Mass., 1986.

Primary Examiner—Joseph Ruggiero
Assistant Examiner—Russell Cass
Attorney, Agent, or Firm—William J. Sheehan; Guy M. Miller; John R. Manning

[57] ABSTRACT

A remote maintenance monitoring system retrofits to a given hardware device with a sensor implant which gathers and captures failure data from the hardware device, without interfering with its operation. Failure data is continuously obtained from predetermined critical points within the hardware device, and is analyzed with a diagnostic expert system, which isolates failure origin to a particular component within the hardware device. For example, monitoring of a computer-based device may include monitoring of parity error data therefrom, as well as monitoring power supply fluctuations therein, so that parity error and power supply anomaly data may be used to trace the failure origin to a particular plane or power supply within the computer-based device. A plurality of sensor implants may be rerofit to corresponding plural devices comprising a distributed large-scale system. Transparent interface of the sensors to the devices precludes operative interference with the distributed network. Retrofit capability of the sensors permits monitoring of even older devices having no built-in testing technology. Continuous real time monitoring of a distributed network of such devices, coupled with diagnostic expert system analysis thereof, permits capture and analysis of even intermittent failures, thereby facilitating maintenance of the monitored large-scale system.

20 Claims, 3 Drawing Sheets

REMOTE MAINTENANCE MONITORING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention generally relates to a remote maintenance monitoring system for monitoring hardware devices, and more particularly concerns a retrofit monitoring system for use in performing integrated diagnostic maintenance of a large-scale computer system having a plurality of distributed hardware devices. The invention further more particularly concerns real time critical point monitoring with non-intrusive sensor implants, combined with expert system diagnostics for automated maintenance, responsive to both intermittent and hard failures.

Monitoring and maintenance of hardware devices present technical problems, especially where no builtin testing features are present in the device to be monitored. The tasks presented are particularly problematic where there are a plurality of devices comprising a distributed large-scale integrated system to be monitored. As the scale of the distributed system expands, with each device thereof having multiple components therein subject to failure, the likelihood generally increases that certain intermittent (i.e., transient) failures of various components and/or devices are either never detected, or are inadequately identified for time-effective correction thereof. Hard failures are no less troublesome, particularly if they result in system degradation during critical system operations.

The need for diagnostic maintenance of large distributed systems, particularly as a retrofit feature to devices not having built-in testing features, is both a wide spread and a multi-faceted problem. The NASA Kennedy Space Center in Florida has several systems which exemplify the technical problems presented with monitoring operations and maintenance of large distributed systems, such as multi-unit computer systems. Such large-scale distributed computer system maintenance needs are problems that face most ground support and space-based systems at the Center.

One such system at Kennedy Space Center is known as the Launch Processing System (LPS). The Launch Processing System is an integrated network of computers, data links, displays, controls, hardware interface devices, and computer software required to control and monitor flight systems, ground support equipment, and facilities used in direct support of shuttle vehicle test activities. The LPS has three major subsystems: the Checkout, Control and Monitoring Subsystem (CCMS); the Central Data Subsystem, and the Record and Playback Subsystem. The purpose of the CCMS is to provide a method for testing, checking out, safing, and operating the vehicle during Shuttle ground operations. The CCMS includes nine different hardware sets with over 200 Modcomp II/45 minicomputers.

Maintenance of a large distributed computer system (like CCMS, having over 200 computers) is a complicated task involving highly manpower intensive diagnostic methodology. Conventional front panel and scope trouble-shooting is one significant limitation on timeeffective maintenance of such large scale distributed systems. Additionally, the particular Modcomp computers of the Kennedy Space Center CCMS lack any built-in self-testing capabilities. Additional factors for any large scale system are increased maintenance needs due simply to the aging of the various hardware components, and potential losses in diagnostic expertise (i.e., attrition among skilled maintenance technicians and engineers). All of the foregoing factors have the potential for adversely impacting any manpower intensive maintenance program.

Traditional maintenance methods relying on limited front panel indications, "roll up" diagnostics, and scope trouble-shooting (all of which generally requires engineers and technicians to be experts on the particular systems being monitored) are inherently limited. Such limitations are particularly highlighted as the scale of the maintenance problem increases, and time constraints and the need for system operational competence increase. Significantly, studies have shown with respect to the Kennedy Space Center's CCMS that, based on operational Modcomp computer history, a significant number of intermittent or transient failures are never found (i.e., specifically isolated) where such traditional monitoring and maintenance methods are utilized.

Another inherent limitation to maintenance of a large system (such as CCMS) is that on-line hardware monitoring of the operational large scale and distributed computer system is extremely limited, since the devices are not subject to being repaired (i.e., can't be operationally interfered with) during critical portions of their operations. Traditional diagnostic methods, often based on ineffective testability of the device as originally designed, frequently result in ambiguous testing results which are difficult to interpret. Intermittent and transient failure problems present particular trouble-shooting difficulties, since the originally designed test points (if any) are normally insufficient for unique fault isolation.

Due to the size of the CCMS, and many other systems having similar maintenance problems, the cost of retrofitting a closed-bus architecture with a built-in self-test capability is normally prohibitive. Notwithstanding such further consideration, all of the foregoing discussed problems generally result in greater than anticipated (or desired) operational cost and downtime for the distributed system. Additionally, the foregoing traditional manpower intensive diagnostic techniques, as applied to large distributed systems, provide virtually no information which would allow anticipation of approaching system failures.

SUMMARY OF THE INVENTION

The present invention recognizes and addresses the foregoing technical problems and others associated with monitoring and maintaining a large distributed system. Accordingly, it is one general object of the present invention to provide a maintenance monitoring system which aids in the diagnostic monitoring and maintenance of hardware devices, whether considered respectively or as part of a distributed multi-device system. It is another general object to provide a remote maintenance monitoring system, which does not interfere with the operation of the device or devices being monitored (either at the device or system level).

It is a another general object of the present invention to provide a remote maintenance monitoring system which has the capability of continuously monitoring various types of hardware devices. It is a more particular object to provide such a monitoring system, which is further capable of capturing failure data from intermittent failures as well as hard failures. It is yet a further object to provide such a system which monitors, and optionally stores, measurements concerning both digital and analog type signals.

It is another general object of the present invention to combine such non-intrusive sensing with a diagnostic expert system, for automating the tasks of diagnosing (i.e., recognizing and isolating) hardware related failures. It is a more particular object for such diagnostic expert system to analyze and isolate hardware failures to particular components within a given device, to permit time-effective maintenance thereof.

It is another general object of the present invention, with respect to data acquisition, to increase the volume and type of data available for analysis, while also capturing failure data near its point of origin, though for relatively remote analysis thereof.

By utilizing a diagnostic expert system, it is a further object of this invention to capture diagnostic expertise, while facilitating automated analysis of multiple, dependent failures. Thus, it is an object to provide a remote maintenance monitoring system capable of providing integrated diagnostics for large distributed computer systems, one example of which is the multi-computer unit CCMS at Kennedy Space Center.

In automating such failure diagnosis, it is a further object of this invention to ultimately predict (i.e., anticipate) approaching system failures, based on analyzed correlations between failure data and system failure histories. In connection with such advanced analysis, it is another object to provide the necessary detailed technical information about specific line-replaceable units to assist in the complete diagnosis of failures, for the rapid resolution of hardware problems in a monitored distributed large scale system.

More specifically in connection with the maintenance of computer-based devices (such as maintenance of the Modcomp computers referred to above), it is an object to provide a "transparent" (i.e., non-intrusive) retrofittable sensor that is capable of collecting appropriate diagnostic data required for failure diagnosis and tracing to a line-replaceable unit level within the computer-based device. It is also a further object to provide such a sensor which captures and forwards such failure data to an expert system, which would in turn analyze the sensor information for automating failure diagnosis. More specifically, it is an object to, for example, monitor parity error and power supply anomaly data from a computer-based device for trace analysis using artificial intelligence to determine the line-replaceable unit level source of the fault, for time-effective replacement of such failed hardware component.

It is also an object to provide enhanced sensor implants capable of capturing memory dump data, back-tracking CPU instructions and addresses, monitoring regulated voltages, evaluating memory transfers in real-time, and recording various discrete signals.

More broadly speaking, it is an object to provide for the effective maintenance of large distributed systems, while reducing the work load of maintenance personnel otherwise engaged in manpower intensive operations. Accordingly, it is an object to achieve increased operational capability and reduced maintenance costs for large distributed computer systems, such as CCMS of Kennedy Space Center, without undertaking the prohibitive cost approach of retrofitting thereto a closed-bus architecture with a complete built-in self-test capability for all of the hardware devices of CCMS. Accordingly, it is a present object to provide automated, intelligent integrated diagnostic and remote maintenance monitoring capabilites for large distributed systems, which is vastly superior to traditional front panel and scope trouble-shooting, with respect to both timeliness and accuracy.

Based upon the foregoing general objects and aspects of this invention, together with the remaining disclosure herewith, those of ordinary skill in the art will appreciate that a variety of embodiments may be provided in accordance with the present invention. Such various embodiments may comprise different combinations of presently disclosed features, with one exemplary embodiment of a remote maintenance monitoring system for monitoring an electronic hardware device, in accordance with the present invention, comprising: nonintrusive sensor implant means, transparently interfaced with a given electronic hardware device so as to not interfere with the operation thereof, for continuously gathering operational data from pre-selected locations within such device; and diagnostic expert means for receiving and analyzing data gathered by the sensor implant means, such expert means being programmed for diagnosing failure causes of the given device based on operational data gathered therefrom; whereby relatively remote diagnostic analysis is achieved using failure data captured near its point of origin.

Another exemplary embodiment of this invention is directed to a remote maintenance monitoring system for on-line hardware monitoring of an operational larges-cale distributed computer system having a plurality of both computer-based and non-computer-based devices. Such monitoring system preferably comprises: a plurality of data collection probes, respectively associated with each of the plurality of devices comprising such distributed system, for transparently monitoring same and outputting corresponding failure data therefrom, respectively; maintenance computer means, including an expert system using a multi-phased iterative approach, for monitoring and analyzing such failure data so as to locate specific failed hardware components in such respective devices, to permit timeeffective replacement of such specific components; and data interface and multiplexer means, for interfacing between the maintenance computer means and the plurality of data collection probes, respectively, such interface and multiplexer means including buffer means for receiving failure data from the probes for subsequent analysis by the maintenance computer means.

Yet another present exemplary embodiment concerns a retrofit monitoring system for assisting integrated diagnostic maintenance of a large-scale computer system having a plurality of distributed hardware devices. Such monitoring system comprises: a plurality of data acquisition modules, respectively associated with the plurality of distributed hardware devices, for performing continuous, real-time monitoring of such devices and capturing intermittent and hard failure data therefrom, without interfering with operational integrity of such devices; data interface and multiplexer means, respectively interconnected with each of the plurality of data acquisition modules, for collecting failure data from the plurality of modules into a centralized failure data analysis location relatively remote from the respective hardware devices; and a diagnostic expert system, situated relatively near the centralized failure data analysis location, for receiving and analyzing collected failure data so as to determine and isolate hardware failures within each respective hardware device to specific replaceable components thereof, whereby multiple, dependent failures in such large-scale, distributed device system are analyzed and isolated to facilitate replacement of such specific hardware components, thereby resulting in automated, time-effective maintenance of such large-scale system.

The foregoing objects, features, and aspects of the present invention are discussed in greater detail below, in the Detailed Description portion of the specification.

BRIEF DESCRIPTION OF THE DRAWING

A full and enabling disclosure of the present invention to those of ordinary skill in the art, including the best mode thereof, is set forth in the remaining specification, with reference to the accompanying figures, in which.

Figure 1:
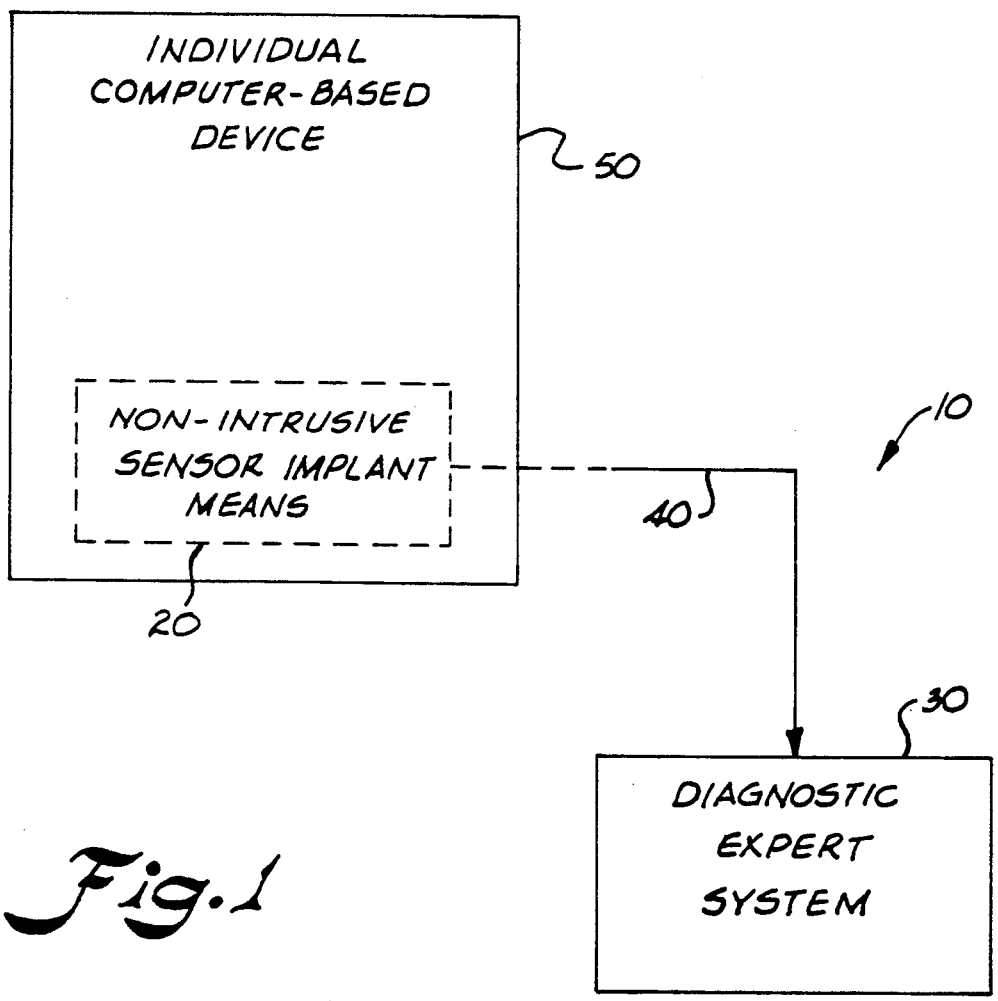
FIG. 1 illustrates in block diagram form one exemplary embodiment of the present invention, particularly adapted for monitoring a single or individual computer-based device.

Repeat use of reference characters in the following specification and accompanying drawings is intended to represent the same or analogous features or elements of the present invention.

DETAILED DESCRIPTION OF THE PREFERRED EMBODIMENTS

Features of the present invention may be practiced in a variety of different embodiments, all of which are in keeping with the spirit and scope of the following disclosure. FIG. 1 illustrates one such exemplary embodiment of this invention, particularly representing a one-on-one or single line (i.e., single string) system. In other words, FIG. 1 represents a basic remote maintenance monitoring system 10 in accordance with the present invention, which includes the minimal system components of a sensor implant 20 and a diagnostic expert system 30.

As illustrated in present FIG. 1, a single communications line or bus 40 interconnects sensor implant means 20 with expert system 30. Thus, even though only a single individual hardware device 50 is being monitored, the present system concepts are represented, in that a non-intrusive sensor implant means 20 is associated with hardware device 50 so as to obtain failure data from device 50 relatively near the source of origin of such data, which data is subsequently diagnosed (at a possibly relatively remote location) by an expert system 30.

Sensor implant means 20 may also be thought of in terms as a data collection probe or a data acquisition module. Individual hardware device 50 is illustrated in the exemplary embodiment of FIG. 1 as comprising a computer-based device, but both the broad aspects of the present invention and the specific sensor implant means of the present embodiment are equally applicable to noncomputer-based hardware devices (though not explicitly represented in FIG. 1; but see application FIG. 2).

The non-intrusive sensor implant means 20 is illustrated in dotted line in FIG. 1, as representative of the fact that it has no adverse influence or impact on the operational capabilities or activities or its respectively associated host device 50. More particular exemplary transparent interface arrangements are discussed below. Moreover, it is to be understood by those of ordinary skill in the art that the precise nature of such sensor implant means may vary considerably, both in accordance with the present invention, and as required by circumstances with monitoring different types of devices.

In general, FIG. 1 also represents that sensor means 20 preferably continuously captures operational data from device 50, and also does so relatively near the source of origin of such data, so as to thereby facilitate detection and analysis of both intermittent (i.e., transient) and hard failures of device 50. Such captured data is then forwarded along bus 40, which in that sense constitutes a form of data interface means with expert system 30. Expert system 30 is preferably programmed in one of the available artificial intelligence expert systems, such as Franz Lisp, Lisp, C, KEE, PROLOG, or SMALLTALK, for diagnosing the failure data obtained by sensor means 20, and for isolating the source of failure within device 50 to a line-replaceable unit level therein. More particularly, the diagnostic analysis undertaken is preferably designed to isolate the origin of fault to a particular replaceable component within device 50 and with relative speed so as to permit time effective automated maintenance of the monitored device or devices.

As addressed in the prior art, particularly in Miller, Artificial Intelligence Application in the Computer/Electronics Industry, pp. 33-44 and 70-85; and Waterman, A Guide to Expert Systems, pp. 249-259, Addison-Wesley Publishing Co., Reading, Mass., 1986, the use of expert systems for maintenance and diagnostic purposes is well known in the art. Particularly pointed out is the use of expert systems for fault isolation purposes, and several exemplary systems are cited. The expert system 30 forming one component of the present invention is not limited to any specific expert system but encompasses any known or later developed system adaptable to the present invention. Those skilled in the art will appreciate that the present invention may be practiced in a wide range of electronic hardware systems with the respective expert system specifically chosen from known or later developed systems and tailored by the user depending on the precise task/procedure the system is to perform for such user.

In achieving such diagnostic analysis, a multi-phase, iterative approach is preferred. As programed, the expert system preferably includes a forward-chaining inference engine with conflict resolution rules for operating on and diagnosing a given set of captured failure data from a respective monitored device 50. Such forms of analysis using artificial intelligence techniques in knowledge-based systems are all directed to accomplishing integrated diagnostics for a distributed large-scale system having a number of networked devices. The concept of integrated diagnostics has generally achieved a certain status in the Research and Development community. Specifically, a formal definition of integrated diagnostics has been developed as follows:

Integrated diagnostics is defined as a structured process which maximizes the effectiveness of diagnostics by interpreting pertinent elements, such as testability, automatic and manual testing, training, maintenance aiding, and technical information as a means for providing a cost effective capability to detect and unambiguously isolate all faults known or expected to occur in systems and equipment and to satisfy system mission requirements. Products of this process are hardware, software, documentation, and trained personnel.

One way in which the present invention achieves its present objectives is the selection of predetermined critical monitoring points for different types of hardware devices, whether computer-based or noncomputer-based.

In computer-based hardware devices, such as the Modcomp computers referred to above in connection with the CCMS at Kennedy Space Center, experience has shown that intermittent memory parity errors are a significant maintenance problem. In some instances, such errors must be examined by looking at particular machine register data at corresponding particular time windows therefor. Moreover, such parity errors may be caused by power supply fluctuations, in addition to hardware failures in various planes of the computer-based device. As one example of the present sensor implant means, critical point of monitoring an individual hardware device, such as a computer-based device, may include interfacing with such device 50 so as to gather data therefrom concerning parity errors and power supply anomalies occurring therein. Utilizing such plural monitored data (as discussed specifically herein with reference to FIG. 3) enables trace analysis for isolation of the source of origin of the failure to a line-replaceable-unit level (i.e., specific replaceable component) within the hardware device.

In general, monitoring of memory parity error signals and power supply levels within an associated computer-based device requires plural digital and analog monitoring ports. More specifically, the parity error data normally constitutes a digital-type signal (i.e., a parity error flag is either on or off). On the other hand, data concerning power supply levels is more of an analog nature, particularly since some amount of variation between predetermined high and low limits is tolerable without indication of an error. For example, analog monitoring ports with programmable over and under voltage limits such as with 40 millivolt resolution may be preferably used when monitoring the Modcomp computer referred to above.

Obtention of the selected digital and analog type information may be variously accomplished in accordance with the present invention. For example, nonintrusive capacitive type coupling may be utilized with appropriate edge connectors associated with the hardware device so that data is obtained by capacitive coupling with edge connector points representing the respectively selected data signals. A signal present at one edge connector point can be monitored by high impedance, capacitive coupling. This would allow multiple failures to occur in the monitoring hardware without impact to the monitored computer. Such an interconnection to the hardware device is in accordance with the present invention since it essentially provides for nonintrusive (i.e., transparent) interfacing with the device. In other instances, interface through a daisy-chained connector can similarly provide the requisite monitoring access, with still a transparent interface such as optical isolation so there is no direct connection.

Another possibility is the use of so-called shadow registers, which provide in parallel information which is found in an active or primary register, so that the information in such primary register is essentially outputted through the shadow register, without adversely operatively interacting with the hardware device. These and other types of transparent interfaces may be used interchangeably with sensor implants or various data acquisition modules in accordance with the present invention, particularly as circumstances vary from different types of devices being monitored.

The sensor implant means 20 of FIG. 1 is intended to be representative of different forms of non-intrusive or transparent interfacing data acquisition modules which may be practiced in accordance with the present invention. The sensor implant intended for monitoring computer-based devices such as the Modcomp computers referred to above, preferably collects both digital and analog data at a plurality of sensor points associated with such device 50. Preferably, whenever one of the sensor points indicates an anomalous condition, that particular measurement and a succeeding series of measurements are recorded. Such data provides the diagnostic expert system 30 with a traceable pattern of the failure process, while also capturing intermittent failure data for device 50. An example of such tracing is discussed below with reference to present FIG. 3. If a data trace buffer or other memory is utilized, a $1024 \times 80$-bit buffer is preferred, which would accommodate 1,023 measurements after the initial anomalous condition measurement.

While considerable variety may be practiced in the sensor implant designs, a microprocessor based system is preferred. One example would be a 16-bit Z8002B microprocessor with a built-in expansion port and a $1024 \times 80$-bit data trace buffer. Utilizing a 100 nanosecond sample rate and programmable sample windows, a plurality of analog monitoring points (for example, 28 analog ports) may be provided with a programmable over and under voltage limits to provide a preset resolution, such as 40 millivolts. Such a resolution range in connection with a nominal 5 volt power supply will permit tracking of fluctuations which are large enough to be detrimental to subcomponent operations of its corresponding device. Such a sensor implant may also include a plurality of digital monitoring points (such as 24 digital ports), optically isolated digital sensors, and interrupt driven error detection so that error detection commences with recognition of a parity bit interrupt from the computer-based device 50.

The sensor implant will also have self-test diagnostics so that monitoring of the performance of the sensor implant itself will not be problematic. Rather, operation of the sensor implant can focus on its intended goal of capturing failure data signals from its associated device, such as a Modcomp computer, without interfering with the operational integrity of such device.

A general example of a parity trace error diagram will be discussed with reference to FIG. 3, below. However, specific parity error and power supply points will vary with different types of computers, and other hardware devices, all of which specific internal points will be known to those of ordinary skill in the art. Such trace diagram in FIG. 3 also serves as an example of diagnostic experience in trouble-shooting failures, such as on the Modcomp computer, which is desirably embodied in the diagnostic expert system 30. Preferably, such system comprises a forward-chaining rule-based inference engine with conflict resolution for distinguishing between competing alternative diagnostic solutions or matching identical failure data from different failure scenarios. More advanced systems are envisioned by the present invention, and form a part thereof, as more particularly discussed below. Larger hybrid type devices, including both rule-based and model-based reasoning, permit automated reasoning for sorting through multiple, dependent failures occurring in a plurality of networked, distributed devices. Such an arrangement permits monitoring of plural sites from a central location for monitoring the health of all of the distributed system hardware.

As alluded to above, sensor implant means in accordance with the present invention may include its own memory means for capturing failure data from its associated device, for subsequent analysis by a diagnostic expert system. It is within the scope of the present invention that such memory function may instead be more removed from the sensor implant itself and form part of an interface means existing between one or more sensor implant means and a diagnostic expert system.

Regardless of its specific embodiment, a data acquisition module generally increases available data for diagnosis while capturing data from even intermittent failures due to constant monitoring of its associated device. As designed, the Modcomp computer merely provided a front panel parity interrupt light. Such expanded failure data is also advantageously captured near its point of origin. Rather than capturing failure data, the diagnostic expert system instead captures diagnostic expertise, while integrating multiple data sources to provide a consistently high level of diagnostic performance.

The FIG. 1 embodiment represents a number of aspects, features and advantages of the present invention. Specific parity error failures were discussed in conjunction with a computer-based device such as the Modcomp computer, because such failures are a common and significant failure mode for such device. Exemplary monitoring of power supply fluctuations occurring within such device not only permits trace isolation of the source of origin for component failures within such device (see the discussion in conjunction with FIG. 3, below), but also demonstrates the capability of given embodiments of the present invention to monitor both digital and analog signals in a meaningful way.

FIG. 1 also represents use of even further enhanced implants. Such enhanced modules preferably would be capable of capturing memory dump data, backtracking CPU instructions and addresses, monitoring regulated voltages, and recording various discrete signals. Thus, the sensor implant itself would essentially integrate and automate the data collection activities of existing maintenance personnel, which activities are both manpower and time intensive. The availability of such expanded data combined with an automated reasoning process utilizing maintenance personnel type experience-based diagnostic techniques would provide a virtual trouble-shooters assistant for monitoring and maintaining distributed systems.

Referring more specifically to the diagnostic expert system 30, a forward-chaining rule-based system preferably includes an inference engine capable of matching a set of rules with multiple instance of failure data and explaining the diagnosis. The written rules are intended to cover all possible failure modes, based on corresponding knowledge of the associated devices being monitored. In the expert system, preferably the rules and the inference engine are distinct entities.

An artificial intelligence computer, such as the Tektronix 4404AI Development System programed with Lisp, is one preferred example of a suitable AI workstation for the FIG. 1 embodiment. Such an exemplary device may use a knowledge-based expert system capable of diagnosing specific failure data such as memory parity errors and power supply anomalies, as discussed below in conjunction with FIG. 3. Integration of different data acquisition modules in an expanded expert system providing a true maintenance console environment would allow technical support personnel to remotely observe trend data, failure modes, and performance of the computers and other integral system hardware in a distributed large system. Such an arrangement would also allow anticipation of approaching failures, based on analyzed correlations of monitored cumulative hardware degradation among the respective plural devices comprising the large-scale system, and hardware failures of such system. The remote maintenance monitoring system would also provide detailed technical information and assistance as needed for the rapid resolution of possible failure modes.

As an artificial intelligence workstation increases in responsibilities, the processing speed and memory should correspondingly increase. Otherwise, severe constraints on the size and speed of the remote maintenance monitoring system may result. As more powerful artificial intelligence systems are utilized in accordance with the present invention, larger hybrid tools, such as incorporating Automated Reasoning Tool and Knowledge Engineering Environment, may be used to provide a model-based/rule-based expert system. Such a hybrid expert system can incorporate an expert's diagnostic heuristics and causal models used for diagnosis. It may also provide for interfacing of integrated graphics and user-interface utilities. Developed knowledge acquisition methodology, one example of which is set forth with reference to present FIG. 3, may also be incorporated. A preventative maintenance system in accordance with the present invention is also capable of predicting impending failures based on indications of hardware degradation, with correlations being made between system failure history and specific failure data.

Present FIG. 1 represents an overview of the invention, particularly applied to a "single string" situation, i.e., one computer or hardware device associated with a single maintenance computer, or diagnostic expert system. As alluded to above, the present invention is equally applicable to a plurality of hardware devices in a distributed, large system. In such instances, frequently the operators of the respective plural hardware devices will not know why failure has occurred to such device, but the purpose of the present invention is that the maintenance computer monitoring such devices will know why a failure occurred, and how to fix it in a time-effective fashion by isolating the origin or source of such failure to a replaceable component therein. In large systems, each hardware device has its own specially selected sensor implant means.

As is mentioned above, one example of a distributed large computer system with which the present invention may be practiced is the Launch Processing System (LPS) at the NASA Kennedy Space Center in Florida. Referring now to present FIG. 2, the top line 100 of such figure is generally representative of the LPS, a further characterization of which is discussed above. In accordance with the right-hand legend of FIG. 2, the remote maintenance monitoring system block diagram illustrated includes small rectangles marked with the letter "C" for representing microprocessor based data collection modules, while the triangular shaped members situated in the top line of the block diagram are unique data probes associated with non-computer-based hardware devices.

The LPS, as mentioned above, includes a great number of interconnected and interrelated hardware devices, datalinks, and accompanying operational software. More particularly, included therein are plural front end processors 102, consoles 104, process data recorders 106, strip chart recording systems 108, and shared peripheral areas 110. Each of such respective devices variously incorporates a Modcomp II/45 computer as referenced above. The sub-block C's within each of the representative devices 102-110 may be variously monitored along corresponding data bus lines 112, 114, 116, 118 and 120. Such monitoring may include for example parity signals and power supply anomaly data, as discussed in detail above, and as is further discussed with reference to FIG. 3 below. As different sorts of computer-based and non-computer-based hardware devices are utilized, monitoring schemes therefor may vary correspondingly.

Figure 2:
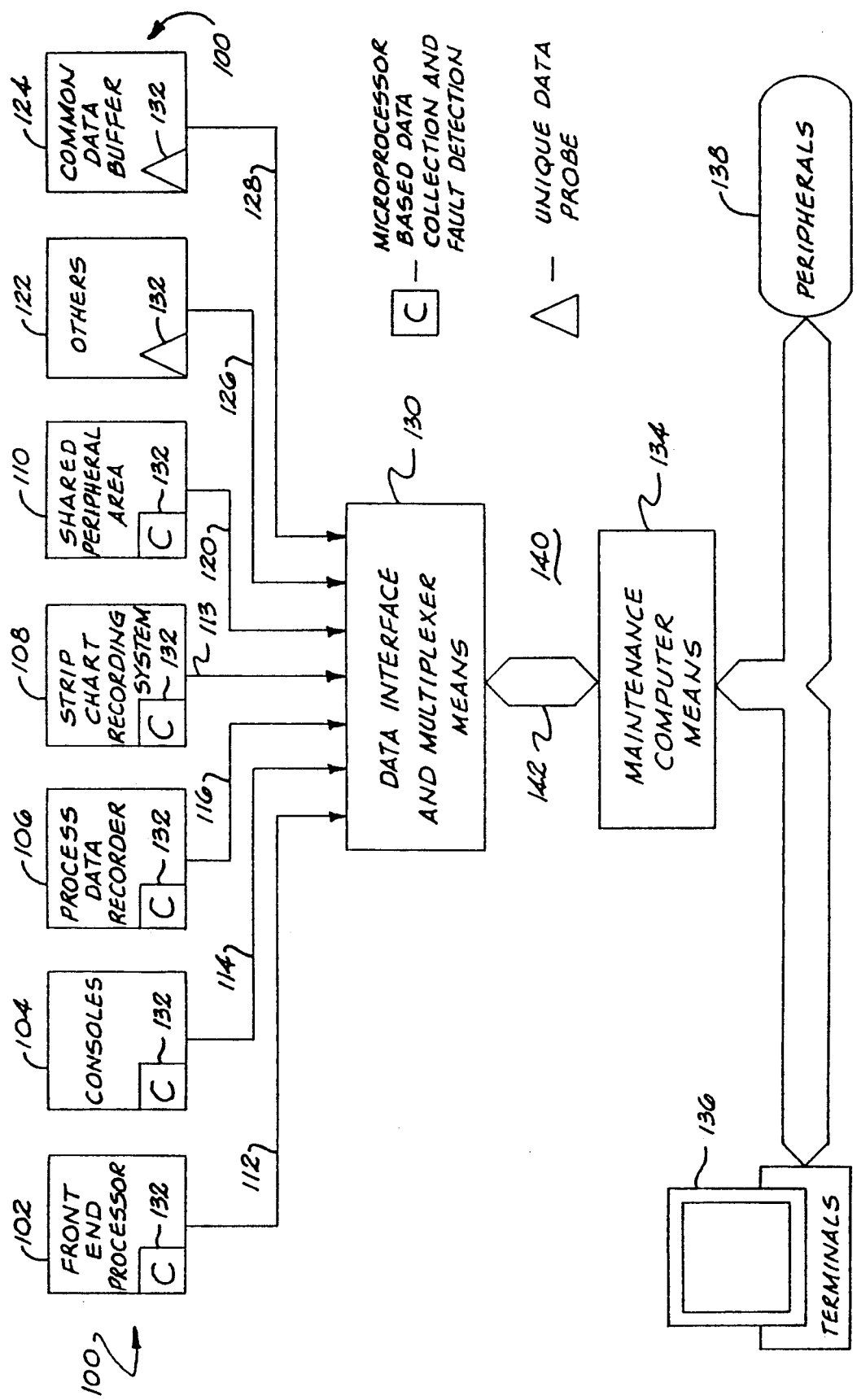
FIG. 2 illustrates in block diagram form another exemplary embodiment in accordance with the present invention, generally representing an expanded remote maintenance monitoring system as compared with the embodiment of present FIG. 1, and particularly adapted for use with a plurality of hardware devices, such as comprising a distributed large system.

Still in the LPS as represented in line 100 of FIG. 2, the general block marked "others" 122 may represent data available in data buses and the like in and around LPS. More specifically, block 124 represents available data from a common data buffer. Operational data from blocks 122 and 124 is also fed over data bus links 126 and 128, respectively, to a relatively central location.

The sensor implant means 132 or data acquisition modules represented in line 100 need not be identical between the respective hardware devices with which they are associated. In fact, it is more likely that various types of sensor implant means would be used in different types of hardware devices with which they are associated for capturing adequate failure data therefrom to permit a trace analysis of such data for isolation of replaceable component failures therein. Such sensor implant means may also optionally include the trace buffer features discussed above, or such features may be variously incorporated into other aspects of the FIG. 2 embodiment. Also, it is to be understood that a distributed large system such as the LPS may include a plurality of consoles, front end processors, or the like, which are merely represented for ease of convenience in illustration by single-illustrated such hardware devices in present FIG. 2. Likewise, corresponding respective sensor implant means would be provided for each such device. In LPS, between 200 and 300 Modcomp computers are generally utilized in given operative configurations thereof.

With further reference to FIG. 2, data interface and multiplexer means 130 is illustrated. Such means interfaces between the plurality of the data collection probes 132, regardless of type, and a maintenance computer means 134. Such maintenance computer means comprises the heart of the diagnostic expert system discussed considerably above. Preferably, particularly in connection with distributed large systems, maintenance computer means 134 comprises a workstationtype platform which supports artificial intelligence activity in conjunction with user interface therewith, such as involving a plurality of terminals 136 and other output peripheral-type devices 138, such as graphic representation of specific failed hardware subcomponents, or graphic information representing overall maintenance condition of the distributed system being monitored.

Another aspect of the present invention represented by present FIG. 2 is that data interface and multiplexer means 130 is preferably located relative remotely from the respective hardware devices 102, 104, 106, 108, 110, 122 and 124, which are being monitored. Thus, realtime monitoring of such devices and captured intermittent and hard failure data therefrom (all without operational interference therewith) is achieved in conjunction with collecting such failure data in a centralized failure data analysis location (generally 140) relatively remote from the respective hardware devices.

As is evident from the illustration of present FIG. 2, maintenance computer means 134 comprising a diagnostic expert system is preferably situated relatively near the centralized failure data analysis location 140, receiving and analyzing such collected failure data over various busing arrangements 142 which may exist between data interface and multiplexer means 130 and maintenance computer means 134. With the foregoing arrangement, multiple, dependent failures among the plural hardware devices of the monitored system may be analyzed and isolated to facilitate timeeffective maintenance of the device sub-components for maintaining health of the distributed system in general.

As wider experience and greater expertise is captured in maintenance computer means 134, and as additional factors of various types are included, an overall goal of integrated diagnostics for a distributed large computer system is attained. Integrated diagnostics is a system engineering approach to diagnostics where all elements effecting maintainability are addressed and integrated. The present system permits detection of real faults and logical elimination of false alarms. Moreover, since critical point data is monitored in real time relatively near its source of origin, certain problems, like intermittent failures, which can't normally be recreated are nonetheless captured and analyzed with the present system.

An example of critical point monitoring (i.e., knowledge acquisition methodology), as well as diagnostic reasoning for use in analyzing captured failure data, all in accordance with the present invention, is set forth with reference to FIG. 3. For consistency, continuing to use the example of the Modcomp II/45 computers, such computers include parity error registers which indicate a parity interrupt condition. In other words, a parity error occurs somewhere within the computer, and an indication of that failure or error is flashed on a register, possibly in a coded sequence. In essence, the available information concerning a parity error is an OR'ed result from a number of internal component sources. A parity error normally causes a hard failure of the computer. It has been possible to use "roll up" diagnostics after a hard failure occurs in an attempt to recreate and isolate the failure. However, statistical studies show that this method does not always result in specific isolation of the component problem. In those situations, it has heretofore been further possible that diagnostics can be run continuously, with logical deduction being used to guide replacement of various components in an attempt to eliminate the hard failure.

Figure 3:
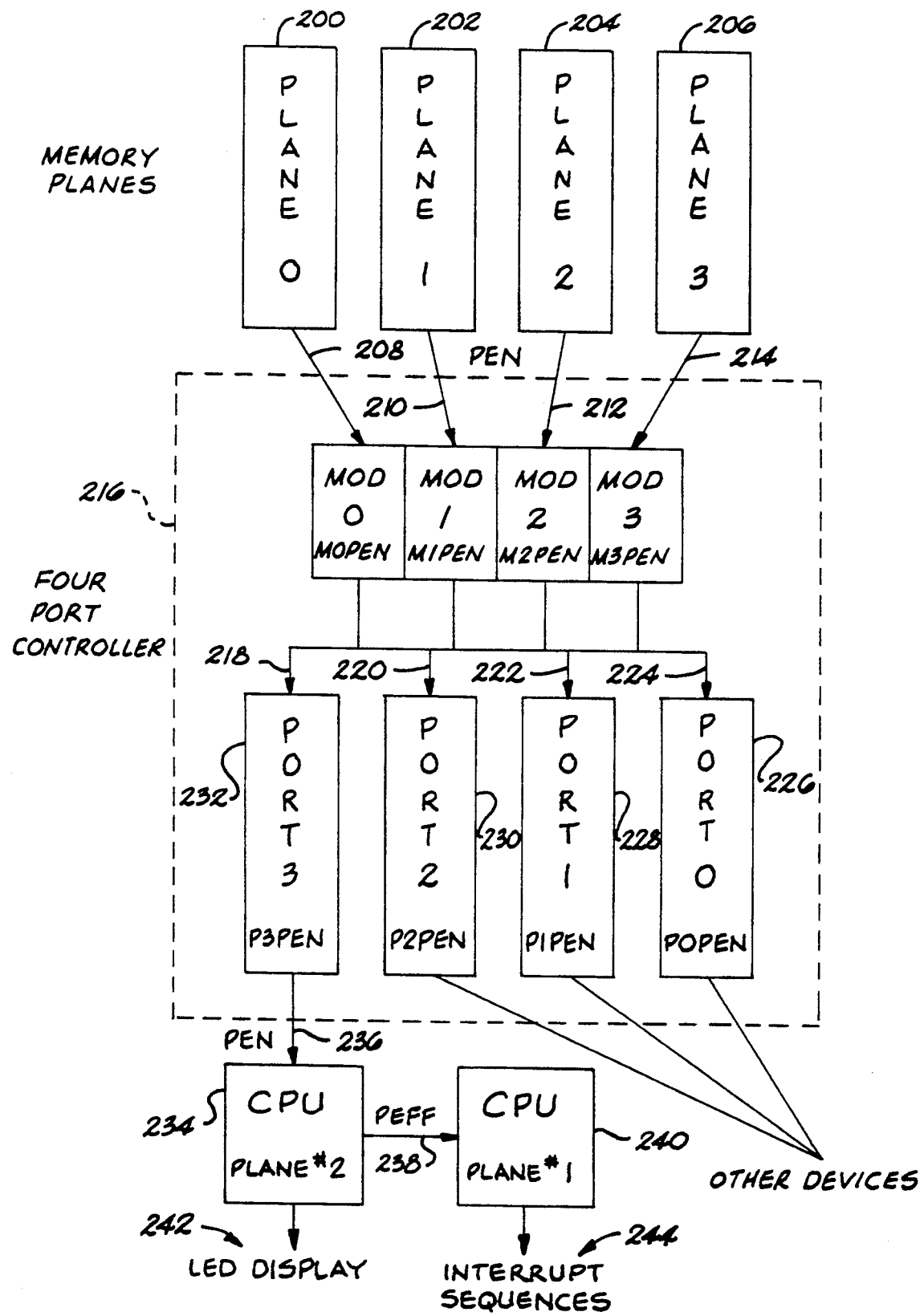
FIG. 3 illustrates a parity error trace diagram, which represents critical point interface with one hardware device to be monitored in accordance with the present invention, as well as an exemplary diagnostic technique or methodology to be utilized in an exemplary diagnostic expert system, in accordance with the present invention.

Present FIG. 3 represents the possibility of socalled multiple, dependent failures which can occur within a Modcomp or other computer-based type device. If there is for example a parity error, the diagnostic process must determine the memory plane on which a parity error was detected and whether such error condition originated on the plane itself or as a result of a fluctuation of power supplied to the plane. Moreover, it is typical that each such plane have its own separate power supply. Any diagnostic algorithm assuming a single source of failure thus cannot diagnose such multiple, dependent forms of failures. Referring now to the various illustrated features of present FIG. 3, an overview of exemplary parity error trace diagram illustrated therein is provided. Continuing to use the Modcomp computer example, there are 16 different interrupt levels for such computer. These interrupt levels include indications of low power, memory parity interrupts, and system protect interrupt. Additionally, each such interrupt level can halt the computer entirely if the interrupt is enabled. Memory parity errors are one type of interrupt which cause the Modcomp computer to stop. The only indication of such a stoppage is a front panel light, which is essentially the result of all parity errors being logically OR'ed.

In accordance with an exemplary diagnostic analysis which diagnostic expert system 30 and/or maintenance computer means 134 may be programmed in accordance with the present invention, parity error signals are traced backwards through the Modcomp computer to determine and isolate the source of origin of such failure.

In general, a Modcomp computer has four memory planes 0-3, represented in the block diagram of present FIG. 3 by blocks 200, 202, 204, and 206, respectively. If a memory parity error signal is generated, the signal moves "forward" through the Modcomp computer on its way to causing an interrupt sequence. For example, a signal "PEN" is sent from its corresponding memory plane over one of lines 208, 210, 212, or 214, respectively. Signal PEN is sent from its originating memory plane to a module x on a four port controller device 216, where it becomes MXPEN. This signal then generates parity errors to each port via lines 218, 220, 222, and 224. As is illustrated in present FIG. 3, such signals in ports 0-3 (ports 226, 228, 230, and 232, respectively) correspond with port error signals P0PEN, P1PEN, P2PEN, and P3PEN, respectively.

By original design, the Modcomp computer's CPU can only access the memory planes through port 3 (block member 232). Thus, it receives signal P3PEN from such port 3 on CPU plane 2 (reference 234) via line 236. CPU plane number 2 responsively generates a parity error flip flop (PEFF) signal 238, which is fed to operational CPU plane number 1 (reference numeral 240). While CPU plane number 2 generates an LED display indicating a parity error (see reference character 242), CPU plane number 1 enables a variety of interrupt sequences (reference 244), which cause the Modcomp computer to stop.

In accordance with the present invention, critical point monitoring relatively near the source of origin of failure data is preferably obtained in the case of the Modcomp computer by monitoring the above-described signals as they move from plane to plane, and through the four port controller 216. Additionally, each one of the memory planes (and possibly others) has its own power supply, which is preferably also monitored (as discussed above) since power supply anomalies can generate error signals though there is no component failure on a corresponding plane itself.

The presence of error signals on the input and output sides of the four port controller, as well as the input and output sides of the CPU planes is likewise monitored, so that adequate information is provided to permit a trace analysis of the source of the parity error for correction of the failure problem at a linereplaceable component level.

Timing signals are also preferably monitored since parity signals only become active at certain periods of time, requiring synchronization so that parity signals are looked for in proper time windows.

As described above, parity error signals move "forward" through the Modcomp computer, by moving first from the originating memory plane to and through the four port controller and then through the various CPU planes. By monitoring all of the potential points which might generate, originate, or pass a parity error signal resulting in an ultimate parity error interrupt, tracing to the source of failure is possible. Moreover, monitoring for power supply anomalies permits isolation of line-replaceable components to even include differentiating between a "bad" memory plane, or the power supply or power supplies therefor.

It is to be understood by those of ordinary skill in the art that various actual monitoring techniques and monitoring schemes may vary between different types of non-intrusive sensor implant means in accordance with the present invention, particularly as data monitoring includes different types of associated devices being monitored. Contacts may be transparently bridged from daisy chained connectors, or other manner of transparent interfaces may be provided, as discussed in general above.

As discussed above, an inference engine utilizing resolution rules to remove conflicts which might occur due to identical failure data are preferred for analyzing captured failure data referred to above with reference to FIG. 3. For example, certain rules may be created to appropriately correspond with circumstances. If an error occurs on plane 0, then a diagnostic rule may instruct that signals relating to the four port controller be examined to determined whether it has received a parity error. If the parity error has successfully traversed the four port controller, then it should be determined whether it is an error at the CPU plane 2, etc. Once a particular parity error is isolated to a particular plane such as memory plane 0, then the power supply regulation thereto may be examined to determine whether the supply fluctuated to such an extent to have actually caused the ultimate interrupt.

Particularly in enhanced or advanced sensor implant modules which capture memory dump data at the time of a failure, CPU instructions and process steps may be examined to determine complicity in component failures at such CPU. For example, if reviewing memory dump data isolates a failure to several planes within a Modcomp machine, and further diagnostics of the sensor implant data isolates the source to be a particular CPU plane, the state of such CPU plane may be examined to see whether it properly processed particular instructions, or whether it went into a recovery mode. Additional memory may be provided to the implant, or to the data interface and multiplexer means, for capturing a certain sequence or length of operational data after a detected failure, or after recognition of an interrupt. All such enhanced sensor implant means are intended to come within the scope of the present invention.

Still further enhancements may be practiced in accordance with the present invention. For example, a shift register circuit may be used to store and transfer to a computer data collected with a logic analyzer to a computer. For example, an eight bit parallel-out serial shift register may be utilized as the basis for forwarding data to a computer from a logic analyzer having no means for storing data. From the computer, the collected data from the analyzer may be saved into a trace buffer. Optionally, display may be provided of the actual date of being accepted.

Still further, on-chip diagnostics may be used to diagnose and correct errors within the remote maintenance monitoring system. Chips available from Advanced Micro Devices include integrated diagnostic capabilities, which would cut down on diagnostic and repair time. Samples of such chips include the AM 2960 Error Detection and Correction, the AM 29818 Eight Bit Pipeline Register, the AM 2962 Four Bit Error Correction multiple Bus Buffers, and the AM 9151 1024×4 Registered Static RAM with Serial Shadow Register capability.

Such shadow register devices, or buried registers, can operate in either serial or parallel modes. Test vectors may be shifted into a group of shadow registered chips, which registers can then be switched into parallel mode and the test vectors loaded into output registers. By cycling the system, the results of test vectors can be thus observed. A device in accordance with the present invention making use of such chips having built-in testing essentially could provide a sensor implant means which would monitor itself as well as other devices.

The foregoing is intended to provide one of ordinary skill in the art with an enabling disclosure of both the broad objects and concepts of the present invention, as well as specific operable embodiments thereof. Those of ordinary skill in the art will appreciate that the foregoing references to specific computers, systems, equipment, components, programs, languages, etc. were nonetheless by way of examples only, and are not intended to limit the subject matter included in the appended claims.

What is claimed is:

1. A remote maintenance monitoring system for monitoring an electronic hardware device, said system comprising:
   non-intrusive sensor implant means, transparently interfaced with a given electronic hardware device so as to not interfere with the operation thereof, for continuously gathering operational data from preselected locations within such device; and
   diagnostic expert means for receiving and analyzing data gathered by said sensor implant means, said expert means being programmed for diagnosing failure causes of the given device based on operational data gathered therefrom;
   whereby relatively remote diagnostic analysis is achieved using failure data captured near its point of origin;
   wherein said sensor implant means is adapted to be retrofit to an existing hardware device, for continuously monitoring and gathering data from such device in real time so as to capture data of even intermittent failures of such device.

2. A remote maintenance monitoring system as in claim 1, further including:
   a plurality of said sensor implant means, respectively associated with a plurality of hardware devices, for real-time monitoring of a distributed network of such devices; and wherein
   such devices comprise computer-based and noncomputer-based types of hardware.

3. A remote maintenance monitoring system as in claim 2, wherein said diagnostic expert means comprises a hybrid model-based/rule-based system for diagnosing multiple, dependent failures in such plurality of devices.

4. A remote maintenance monitoring system as in claim 2, further including:
   data interface and multiplexer means for respectively interconnecting each of said plurality of sensor implant means with said diagnostic means; and wherein
   each of said sensor implant means interfaced with a computer-based hardware device respectively includes a microprocessor-based component having plural digital and analog monitoring ports for respectively receiving memory parity error signals and power supply levels from its corresponding computer-based device, through capacitive coupling with appropriate edge connectors associated with such device, and wherein each such sensor implant means further includes a trace buffer for storing a memory dump from its corresponding computer-based device upon the occurrence of a failure thereof.

5. A remote maintenance monitoring system as in claim 1, wherein said expert system includes a forward-chaining interface engine with a conflict resolution mechanism and rules for operating on and diagnosing a given set of captured failure data for a respective monitored device, so as to isolate failure cause thereof to a line-replaceable-unit level therein.

6. A remote maintenance monitoring system for monitoring an electronic hardware device so as to achieve relatively remote diagnostic analysis using failure data captured near its point of origin, said system comprising:
   non-intrusive sensor implant means, transparently interfaced with a given electronic hardware device so as to not interfere with the operation thereof, for continuously gathering operational data from preselected locations within such device, and
   diagnostic expert means for receiving and analyzing data gathered by said sensor implant means, said expert means being programmed for diagnosing failure causes of the given device based on operational data gathered therefrom; wherein
   said sensor implant means is adapted for interface with a computer-based hardware device, for gathering data of parity errors and power supply anomalies occurring within a given such computer-based device to which it is interfaced; and
   said diagnostic expert means utilizes such parity error and power supply anomaly data for determining the cause of such errors and anomalies in such computer-based device, and isolating the origin thereof to a line-replaceable-unit level within such device.

7. A remote maintenance monitoring system as in claim 6, wherein said expert system includes a Tektronix 4404 artificial intelligence computer programmed with Lisp.

8. A remote maintenance monitoring system as in claim 6, wherein said expert system analyzes said parity error and power supply anomaly data by tracing the parity error signals back through the corresponding computer-based device, correlated with the specific power supply fluctuations therein, to isolate the source of the original hardware problem to a memory plane, a CPU plane, a respective power supply thereof, or other specific replaceable component of such device.

9. A remote maintenance monitoring system for online hardware monitoring of an operational large-scale distributed computer system having a plurality of both computer-based and non-computer-based devices, said monitoring system comprising:
   a plurality of data collection probes, respectively associated with the plurality of computer-based and non-computer-based devices comprising such distributed system, for transparently monitoring same and outputting corresponding failure data therefrom, respectively;
   maintenance computer means, including an expert system using a multi-phased interactive approach, for monitoring and analyzing such failure data so as to locate specific failed hardware components in such respective devices, to permit time-effective replacement of such specific components; and
   data interface and multiplexer means, for interfacing between said maintenance computer means and said plurality of data collection probes, respectively, said interface and multiplexer means including buffer means for receiving failure data from said probes for subsequent analysis by said maintenance computer means.

10. A remote maintenance monitoring system as in claim 9, wherein said data collection probes continuously monitor in real time their respectively associated distributed system devices, so as to capture intermittent failure data as well as hard failure data relative such devices.

11. A remote maintenance monitoring system as in claim 9, wherein each of said data collection probes comprises a microprocessor having plural digital monitoring ports, and plural analog monitoring ports with programmable over and under voltage limits.

12. A remote maintenance monitoring system as in claim 11, wherein:
   said microprocessor comprises a Z8002B-based 16-bit microprocessor, said digital monitoring ports are respectively associated with memory plane parity error signals from an associated device for monitoring intermittent memory parity errors, and said analog monitoring ports are respectively associated with power supply points in such associated device for monitoring power supply fluctuations greater than said voltage limits; and wherein
   said data collection probes each further include a data trace buffer for capturing memory dump data at failure to permit subsequent trace analysis thereof; and further wherein
   said expert system includes a forward-chaining inference engine with a conflict resolution mechanism and rules for trace analyzing said buffer-captured data and data received at said digital and analog monitoring ports.

13. A remote maintenance monitoring system as in claim 9, wherein said data collection probes are adapted for capturing memory dump data, including address and instruction trace data, during and at least for a given time subsequent to, a failure occurrence within its associated device.

14. A remote maintenance monitoring system as in claim 9, wherein said maintenance computer means expert system incorporates therein integrated diagnostics adapted for predicting failures in the large-scale distributed computer system being monitored, with such predicting being based on analyzed correlations of monitored cumulative hardware degradation among the respective plural devices comprising such large-scale system, and hardware failures of the large-scale system.

15. A remote maintenance monitoring system as in claim 9, wherein said data collection probes are adapted to be retrofit respectively to existing hardware devices, for continuously monitoring and gathering data from such devices in real time so as to capture data of even intermittent failures of such devices.

16. A retrofit monitoring system for assisting integrated diagnostic maintenance of a large-scale computer system having a plurality of distributed hardware devices, said monitoring system comprising:
   a plurality of data acquisition modules, respectively associated with the plurality of distributed hardware devices, for performing continuous, real-time monitoring of such devices and capturing intermittent and hard failure data therefrom, without interfering with operational integrity of such devices;
   data interface and multiplexer means, respectively interconnected with each of said plurality of data acquisition modules, for collecting failure data from said plurality of modules into a centralized failure data analysis location relatively remote from the respective hardware devices; and
   a diagnostic expert system, situated relatively near said centralized failure data analysis location, for receiving and analyzing collected failure data so as to determine and isolate hardware failures within each respective hardware device to specific replaceable components thereof, whereby multiple, dependent failures in such large-scale, distributed-device system are analyzed and isolated to facilitate replacement of such specific hardware components, thereby resulting in automated, time-effective maintenance of such largescale system.

17. A retrofit monitoring system as in claim 16, wherein:
   said data acquisition modules each comprise microprocessor-based sensor implant means, having respective plural analog and digital monitoring ports for continuously monitoring critical point analog and digital signals, respectively, within its associated hardware device, and further having a data trace buffer for capturing memory dump failure data for its associated hardware device to permit subsequent component-isolation analysis thereof; and wherein
   said expert system includes a hybrid modelbased/-rule-based system for analyzing and diagnosing such plural failure data and such analog and digital signals.

18. A retrofit monitoring system as in claim 16, wherein:

the large-scale computer system being maintained includes over 200 distributed computer-based devices; and said data acquisition modules associated with such computer-based devices non-intrusively monitor both digital and analog signals thereof, associated with memory parity error failure signals generated by its associated computer-based device, and analog signals thereof, corresponding to power supply levels therein so as to detect power fluctuations influencing various hardware components of such associated computer-based device;

whereby capturing of such memory parity errors and power supply fluctuations permits parity error trace analysis thereof for the isolation of hardware failures to particular line-replaceable components of such associated computer-based device.

19. A retrofit monitoring system as in claim 16, wherein said expert system is adapted for predicting failures in the large-scale computer system being maintained, based on monitoring of the plurality of distributed devices comprising such large-scale system, and correlating data from such devices with computer system failure experience.

20. A retrofit monitoring system as in claim 16, further including a plurality of terminals and peripheral devices, such as printers and other graphics output devices, associated with said diagnostic expert system for facilitating user interface therewith.

* * * * *